United States Patent [19]

Axler et al.

[11] Patent Number: 5,305,197
[45] Date of Patent: Apr. 19, 1994

[54] COUPON DISPENSING MACHINE WITH FEEDBACK

[75] Inventors: Mark W. Axler, Troy; Anthony L. Nansour, Clawson; Donald J. Zink, Berkley, all of Mich.

[73] Assignee: IE&E Industries, Inc., Ferndale, Mich.

[21] Appl. No.: 969,022

[22] Filed: Oct. 30, 1992

[51] Int. Cl.$^5$ .................. G06F 15/22; G06F 15/24; G06G 7/52; G06G 7/48; G07G 1/12
[52] U.S. Cl. .................................... 364/401; 364/405; 364/479
[58] Field of Search ................ 40/447, 448, 541, 545, 40/611; 312/223.2, 223.3; 340/573; 364/400, 401, 479; 371/16.3, 16.5

[56] References Cited

U.S. PATENT DOCUMENTS

| | | |
|---|---|---|
| 1,943,719 | 1/1934 | Buhr . |
| 3,267,595 | 8/1966 | Levy et al. . |
| 3,314,049 | 4/1967 | Felcheck . |
| 3,838,260 | 9/1974 | Nelson ................. 371/16.1 |
| 4,084,338 | 4/1978 | Ross ...................... 40/592 |
| 4,193,114 | 3/1980 | Benini .................. 364/401 |
| 4,225,808 | 9/1980 | Saraceni ............... 315/307 |
| 4,440,457 | 4/1984 | Fogelman et al. ..... 312/223.3 |
| 4,538,273 | 8/1985 | Lasser .................. 371/16.3 |
| 4,586,179 | 4/1986 | Sirazi et al. ........... 371/16.3 |
| 4,593,391 | 6/1986 | Mizushima et al. .... 371/16.5 |
| 4,600,249 | 7/1986 | Anderson .............. 361/394 |
| 4,654,793 | 3/1987 | Elrod ................... 364/401 |
| 4,674,041 | 6/1987 | Lemon et al. ......... 364/401 |
| 4,703,423 | 10/1987 | Bado et al. ........... 364/400 |
| 4,723,212 | 2/1988 | Mindrum et al. ...... 364/401 |
| 4,775,935 | 10/1988 | Yourick ................ 364/401 |
| 4,789,907 | 12/1988 | Fischetti et al. ....... 360/33.1 |
| 4,797,818 | 1/1989 | Cotter ................... 364/401 |
| 4,845,636 | 7/1989 | Walker .................. 364/479 |
| 4,853,678 | 8/1989 | Bishop, Jr. et al. .... 340/573 |
| 4,896,791 | 1/1990 | Smith .................... 221/7 |
| 4,908,761 | 3/1990 | Tai ....................... 364/401 |
| 4,959,686 | 9/1990 | Spallone et al. ....... 364/401 |
| 4,972,318 | 11/1990 | Brown et al. ......... 364/403 |
| 4,982,346 | 1/1991 | Girouard et al. ...... 364/550 |
| 4,984,155 | 1/1991 | Geier er al. ........... 364/401 |
| 4,984,170 | 1/1991 | Hirahara ............... 364/464.01 |
| 5,018,291 | 5/1991 | Pasquale et al. ....... 40/642 |
| 5,023,435 | 6/1991 | Deniger ................ 235/375 |
| 5,039,848 | 8/1991 | Stoken ................. 235/387 |
| 5,041,972 | 8/1991 | Frost .................... 364/401 |
| 5,053,956 | 10/1991 | Donald et al. ......... 364/401 |
| 5,056,019 | 10/1991 | Schultz et al. ........ 364/405 |

OTHER PUBLICATIONS

Sugarman; "A Scroll through the Futuremarket"; *The Washington Post;* May 28, 1986.
"Let the Directory Do the Walking"; *Chain Store Age Executive;* v65, No. 11, p. 116; Nov. 1989; Dialog ACC#08140443.
Brochure of Magnetec Corporation entitled *"Printing Systems for Public Access Terminals,"* published Dec. 1986.

*Primary Examiner*—Roy N. Envall, Jr.
*Assistant Examiner*—Stephen Tkacs
*Attorney, Agent, or Firm*—Dykema Gossett

[57] ABSTRACT

A system for printing consumer selected items includes a central computer, a display of various types of consumer items, a keyboard interfaced with the central computer to allow a consumer to select one of the displayed items, a printer enabling an item to be printed in response to the consumer selection, and a sensor interfaced with the central computer to sense the presence of a consumer in the vicinity of the system. The system further includes a memory which stores the types and amounts of consumer items ordered and further records the operation of the sensor to determine how often the consumer is in the vicinity of the system.

20 Claims, 6 Drawing Sheets

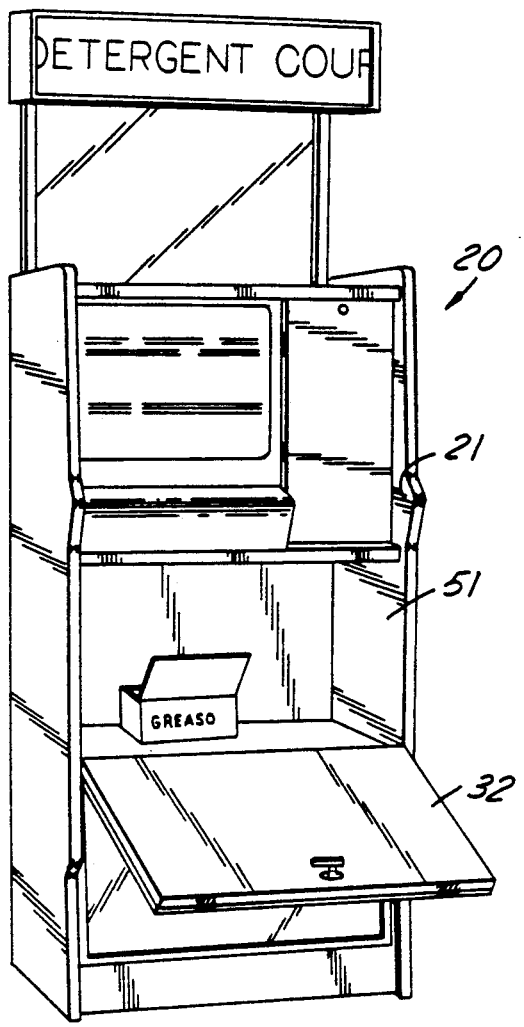
FIG.8A
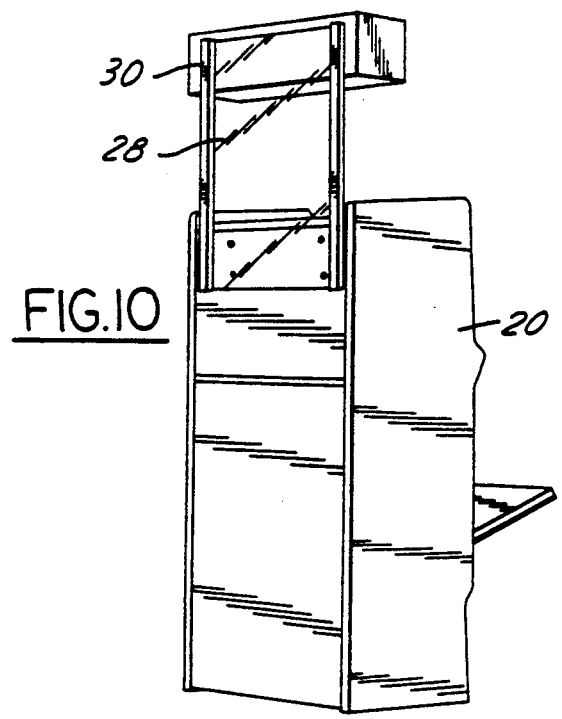
FIG.10
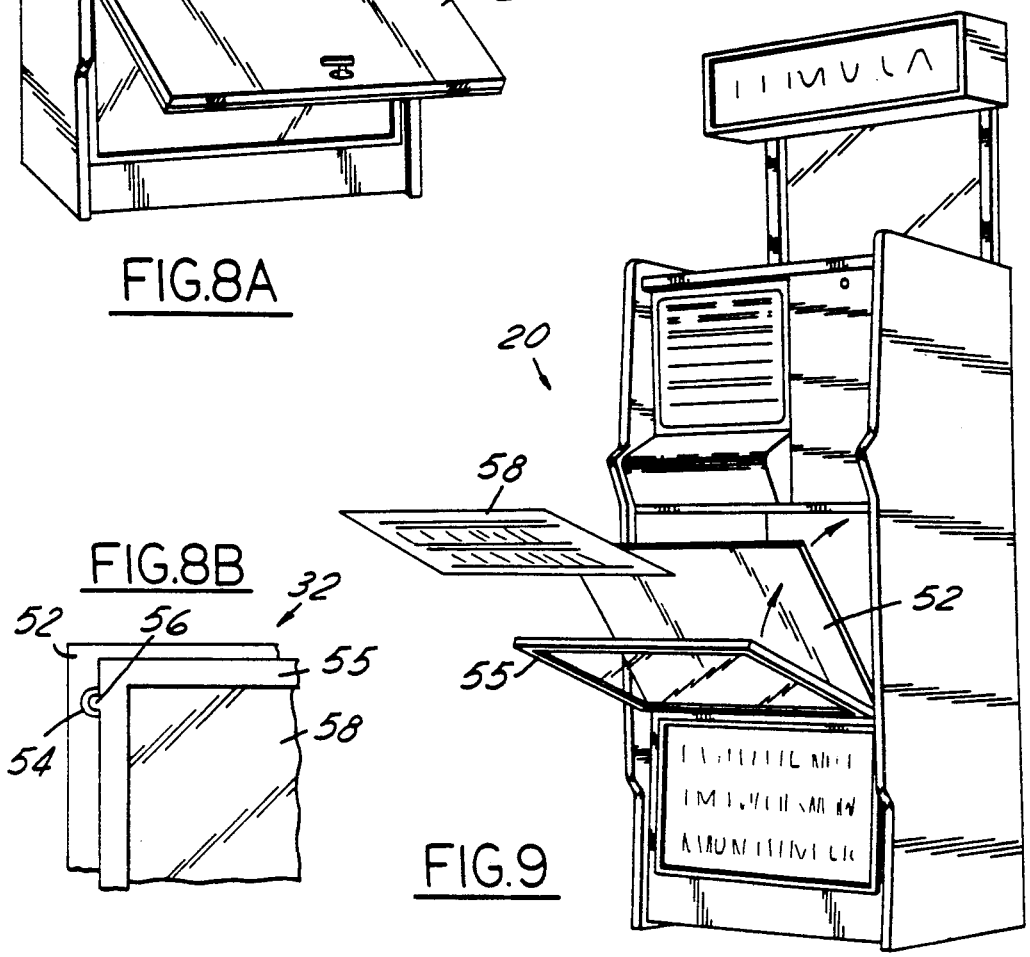
FIG.8B
FIG.9

COUPON DISPENSING MACHINE WITH FEEDBACK

BACKGROUND OF THE INVENTION

This application in general relates to a coupon dispensing machine which provides feedback of several operating factors during the operation of the machine.

The prior art has begun to utilize machines to replace the historic offering of printed coupons to consumers through mail, printing in newspapers, flyers, etc. Modern coupon dispensing machines are typically placed in a retail environment, such as a supermarket, and offer consumers a selection of several different coupons. The consumer selects the coupons that are of interest, which are then printed. Several different types of coupon dispensing systems are known, and they are beginning to enjoy some success.

One problem with known coupon dispensing machines is they do not provide sufficient feedback of the amount of coupons selected from a particular store, and further the amount of activity for a particular coupon dispensing machine in a particular retail environment. As an example, a manufacturer of a particular consumer item might like to have some indication of whether a certain coupon is highly desirable in a particular supermarket prior to paying for its inclusion on a coupon dispensing machine at that supermarket. The prior art systems provide no such feedback.

Further, in the prior art, it has been somewhat difficult to change the display of available coupons due to the way they have been displayed. Typically, they have been included in color photographs, or entered into a computer database and displayed graphically.

SUMMARY OF THE INVENTION

In a disclosed embodiment of the present invention, a coupon dispensing machine provides a record to an operator of the coupon dispensing machine of the number and types of coupons ordered from each machine location. This feedback may also include the amount of time that a consumer was in the vicinity of the coupon dispensing machine, and would also preferably provide some indication that the machine is properly operating through each discrete period of time.

The coupon machine operator periodically "visits" the machine (either physically or electronically) and changes the data in the machine, which includes the particular coupons to be displayed. Preferably at that time the coupon machine operator takes stored feedback in the machine, which typically includes the number of coupons purchased, the percentage of time that a consumer was in the immediate vicinity of the machine, and whether the machine was operating properly through each time period.

To accomplish these goals, the coupon machine operator may periodically enter a new floppy disk in the machine, which is exchanged for an old floppy disk. The old floppy disk would contain information relative to the amounts of coupons for that period of time, the types of coupons dispensed for that period of time, the percentage of time that consumers were in the vicinity of the machine, and also the operating history of the machine (i.e., whether the machine operated properly during that period). As an alternative to the floppy disk, data may be transmitted and received from the machine through a telephone line. All data transmissions whether via floppy disk or telephone link are protected by a security system which preserves the data integrity and insures that valuable data is protected from theft. One version of the Coupon Machine will utilize a CRT based color display. This unit will support unattended coupon updates via the telephone link.

Preferably, a motion sensor on the machine senses whether a consumer is in the immediate vicinity. If the motion sensor senses a consumer in the area, a signal is sent to a memory in the machine. Further, the motion sensor may be tied into various attachments such as a LED scroll sign that would display messages to the nearby consumer to prompt operation of the machine. Also the machine attracts attention to itself via the LED's within the keypad which flash in a random eye-catching pattern and invitation messages which appear on a Vacuum Fluorescent (VF) display. When a user approaches the machine, the machine could be said to be in "greet" mode. When no consumer is sensed in the immediate vicinity, the machine may be in an "attract" mode to attract consumers.

A watchdog system insures that proper operation is occurring. If proper operation does not occur, the watchdog system preferably detects the error within 2.5 seconds and automatically attempts to clear the error and restore proper operation to the machine. The occurrence of such an error and subsequent restart is recorded in the permanent system memory such that the coupon machine operator will have an indication that the error occurred.

In a further feature of the present invention, the coupon dispensing machine is in a cabinet which allows the unique display of a plurality of ads in addition to the coupon ads. As disclosed above, the particular coupons to be displayed are changed periodically. The dispensing machine preferably includes a paper display of the particular coupons for that particular period of time. The cabinet more preferably includes a plurality of lights positioned behind that paper display to make the display more visually impressive.

Further, the unique packaging of the various portions of the coupon dispensing machine allows one to be able to gain selective access to particular portions of the machine for maintenance, routine changing of the data in the machine, or for repair.

At the heart of the machine is an embedded IBM PC compatible computer running a MS-DOS operating system. Surrounding the embedded PC is a fault tolerant, data secured operating environment which completely "encloses" the embedded PC and provides a stable, invisible, and secure processing environment. The fault tolerant, data secured operating environment allows the benefits of an embedded PC to be harnessed without involving the traditional problems associated with using an embedded PC for control. The embedded PC is completely hidden from the user by the fault tolerant, data secured operating environment. The fault tolerant, data secured operating environment monitors various operations of the system and reports abnormal events by date and time to permanent system memory. The fault tolerant, data secured operating environment will always seek to maintain the coupon machine in a fully functional state, however if an error occurs which the error recovery mechanisms cannot correct, the environment will signal that the machine has become inoperative either through the scrolling LED sign, or the telephone link. The fault tolerant, data secured operating environment provides two way secured communications between the machine and the data processing center via floppy disk data transfer or telephone line link (either direct line or mobile phone).

Outside the fault tolerant, data secured operating environment is a real-time data collection system which utilizes real-time clocks and a motion sensor to gather statistical data regarding traffic in the immediate vicinity of the coupon machine. The motion sensor also provides detection of the presence of a consumer near the machine. The real-time data collection system is linked to the internal coupon machine database and provides regular summarization reports that involve various traffic statistics, usage statistics, and overall activity at the machine placement site. Another part of the real-time data collection is the audio sub-system, although this sub-system does not involve data collection, it utilizes the real-time facilities of the data collection system to control and sequence the music and voice output of the system.

Information from the real-time data collection system passes through to the outer layer where the operating system uses the real-time information in conjunction with other data to establish the operating state of the coupon machine. Command and control signals pass from the operating system to the real-time data collection system to control the audio sub-system.

The layered architecture of the machine is significant in that the fault tolerant, data secured operating environment and the real-time data collection system are not simply function modules appended onto the coupon machine. These parts of the overall system provide information and stimulus that affect every portion of the operating system.

The audio sub-system is the portion of the real-time data collection system which controls music and voice output of the coupon machine. The audio sub-system is capable of playing background music while simultaneously outputting pre-recorded voice messages or other sound information. The audio relies on the real-time mechanisms which reside in the data collection system to control the sound generation hardware. The audio sub-system is completely controlled by the operating system which resides in the outer layer of the overall system.

These and other features of the invention will be best understood from the following specification and drawings, of which the following is a brief description.

BRIEF DESCRIPTION OF THE DRAWINGS

FIG. 8a is a perspective view showing access to a portion of the machine.

FIG. 8b is an enlarged view of a portion of the coupon dispensing machine.

FIG. 9 is a perspective view similar to FIG. 8a.

FIG. 10 is a back view of the machine.

DETAILED DESCRIPTION OF A PREFERRED EMBODIMENT

Figure 1:
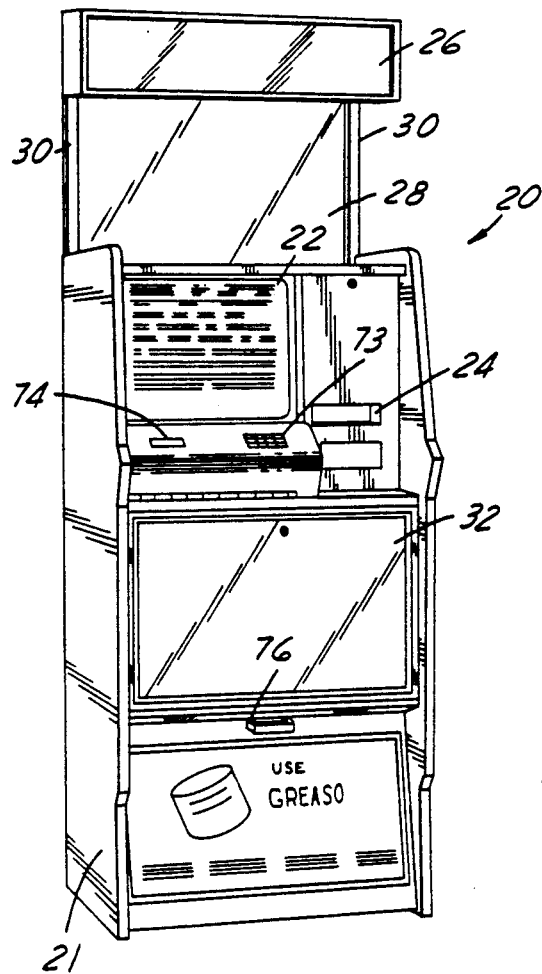
FIG. 1 is a perspective view of a first coupon dispensing machine.

FIG. 1 is a perspective view of coupon dispensing machine 20 incorporating a cabinet 21 having display board 22 displaying a plurality of coupons which may be ordered. Display board 22 snaps on and off cabinet 21. A consumer is prompted on VF display 74 to enter the number of coupon on illuminated keypad 73, and the printed coupon is delivered through slot 24. A motion detector 76 is positioned on the unit to gather statistics involving traffic in the area and the presence of a consumer near the machine. A scroll sign 26 sends messages to the consumer. Scroll sign 26 is preferably multicolor and can scroll and flash. An advertising space 28 may include an advertisement between two stands 30 which position the scroll sign 26 above cabinet 21. A further advertisement 32 may be positioned beneath the operative components 22 and 24.

Figure 2:
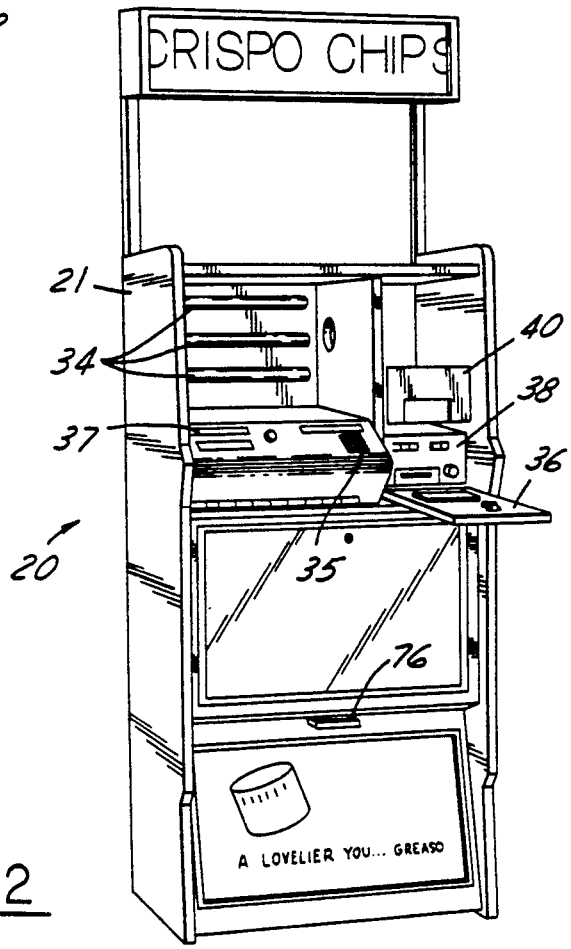
FIG. 2 is a view similar to FIG. 1, but showing access to certain portions of the machine.

As shown in FIG. 2, a plurality of lights 34 may be positioned behind display board 22. Display board 22 may include a piece of paper in a frame which is periodically changed to change the particular coupons which are being offered by machine 20. The frame snaps onto cabinet 21.

As shown in FIG. 2, a keypad 35 is utilized to select a particular coupon which may be displayed on board 22. Keypad 35 contains individual illuminated LED's which perform three functions: (1) they work in conjunction with the VF display to prompt the user for input, (2) they provide feedback to the user, and (3) they flash in a random pattern to attract attention when no one is near the machine. VF readouts 37 send messages to the consumer relative to the operation of the machine, or as an attractant to encourage the consumer to select a coupon.

Figure 3:
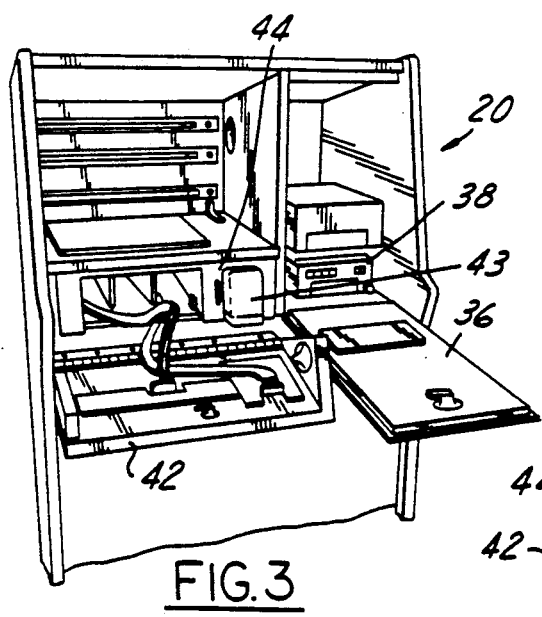
FIG. 3 is a perspective view showing access to additional portions of the machine.

Door 36 pivots outwardly to provide access to a floppy disk drive 38. A floppy disc can be used in lieu of the telephone link for secured two way transfer of information between the machine and the information processing center. Such information includes coupon data, LED sign programming data, and sound data flowing to the machine and usage data and traffic statistics flowing from the machine. Printer 40 may also be incorporated into this compartment of cabinet 21. Floppy disc drive 38 and printer 40 may be mounted on drawer slides such that they slide out of cabinet 21 for easy access. It is preferred that printer 40 have a presentor, such that a coupon is printed and cut from a roll, and rollers then roll the printed coupon out of slot 24. This prevents jamming. FIG. 3 shows a door 42 being opened to provide access to another compartment in cabinet 21. As shown, doors 42 and 36 have separate locks. Thus, the machine 20 may provide separate access to door 36 and door 42. Door 36 must be accessed to allow one to periodically change the disk within floppy disk drive 38. Door 42 will not necessarily be accessed as frequently, as it allows access to an audio amplifier 43, and a printer circuit sliding drawer 44.

Figure 4:
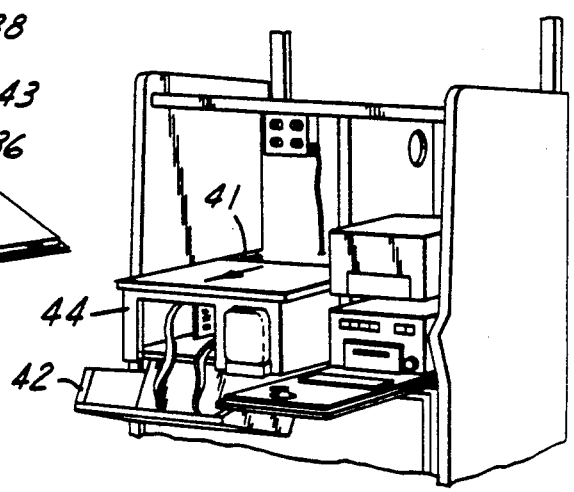
FIG. 4 is a perspective view similar to that shown in FIG. 3.
Figure 5:
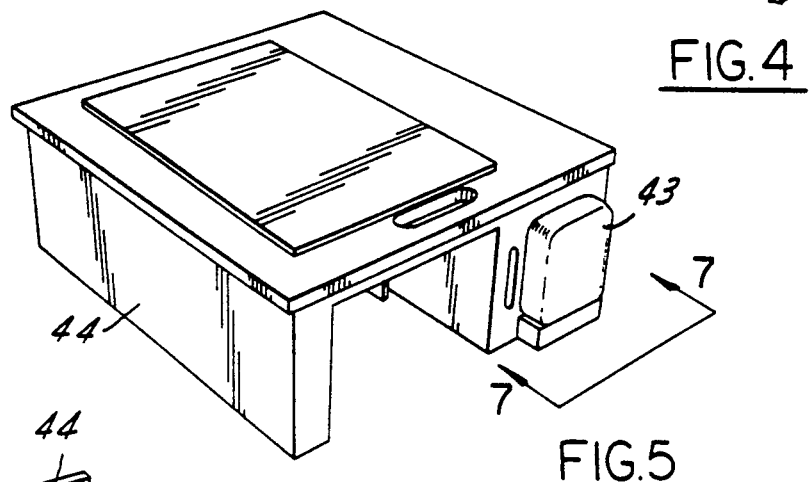
FIG. 5 is an enlarged view of a portion of the inventive machine.
Figure 6:
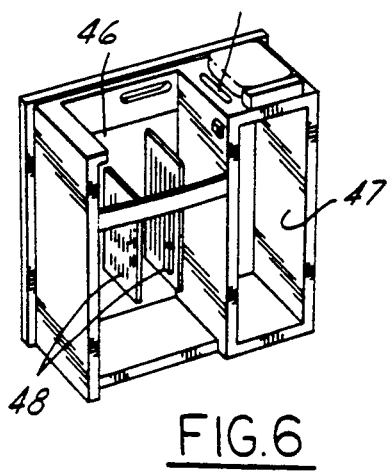
FIG. 6 is a bottom view of the portion shown in FIG. 5.

As shown in FIG. 4, drawer 44 slides in slots 41 for removal. FIGS. 5 and 6 show details of drawer 44 from various angles. A mother board 46 may carry I.O. boards 48 for the particular system. A separate compartment 47 receives the power supplies.

It is envisioned that the basic machine 20 could be easily modified by changing boards 48 to vary the function of machine 20. Thus, although this machine is particularly described as a coupon dispensing machine, it has applications in printing computer selected items for various other purposes. As examples, classified advertising including personal ads, used cars, boats, help wanted ads, resume machines, or any other form of classified advertising can be utilized. Further, the machines could be used for manufacturer's rebates, general information machines such as map and directions, travel tour guides, historical landmark information, library card index machines, pharmaceutical machines to provide information on medicine, recipe machines for use in supermarkets, consumer point of purchase machines such as catalog showrooms, fast food menu selection for customers, or a general store directory machines. Further, the machine could be utilized to provide information on new cars including features and prices, it could be used for personal loan application machines, it could be used for an office building directory, event and scheduling machines such as sporting events, train schedules, plane schedules. Further, the machine could be used for weather information, movie theater guides, radio frequency guides, television schedules, news agenda machines, survey and polling machines, a public service phone directory, stock quotes, or bookstore directories.

With additional hardware, the machine can be utilized for ticket sales for use in travel, entertainment and passes. Further, the machine can be utilized for credit report requests, telephone calls, aroma machines to provide a consumer with an indication of their aroma of a particular food or perfume, and also for health machines which measure weight, height and blood pressure.

Several types of hardware can be integrated into the machine to achieve these functions, although that is not necessary for its basic functioning. As an example, the machine may be integrated with a telephone handset for the consumer, a telephone handset for service personnel, a credit card reader, a coin/cash box, a video camera for security, a digital camera for security, a voice recorder, a shock sensor and a mechanical turate to rotate for use as a perfume scent machine.

Further, the machine may also be developed to incorporate a handicap machine which would position the various members at a wheelchair height and angle. A machine for use with blind consumers might include braille keys and voice output. Further, the machines can be modified to be private label machines to match a particular consumer product. Also, the machines can be adapted for use outside, including stainless steel cases and sealed components. The basic machine might have pressed wood cabinet structures.

Figure 7:
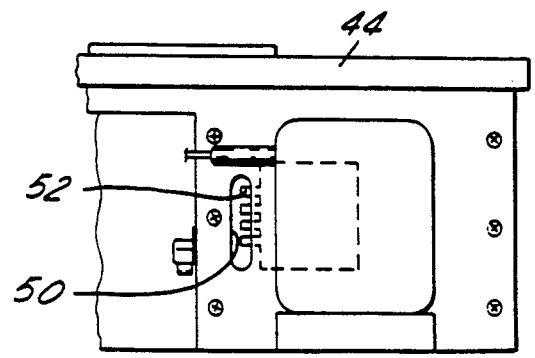
FIG. 7 is an end view along lines 7—7 as shown in FIG. 5.

FIG. 7 shows further features of drawer 44. As shown, a slot 50 is aligned near a plurality of lights 52. Lights 52 are associated with the Watchdog system which monitors the power supplies located in compartment 47. The LED's are visible through slot 50 and provide a visual indication of the status of the power supplies. If the green LED is lit, all the power supplies are operating within their specified limits. If the green LED is extinguished, the faulty power supply can be determined because its associated red LED will also be extinguished.

FIG. 8a shows a further aspect of cabinet 21. As shown, a large space 51 is positioned beneath the operating components and may be utilized to store various items for the functioning of the machine. As an example, additional paper for the printer roll, parts, or various operative materials and tools may be stored in that area. A door 32 provides selective access to space 51.

As shown in FIG. 8b, door 32 will selectively allow the changing of an advertisement. Door 32 includes a backboard 52 having a lock nut 54. A frame member 55 is selectively connected to lock nut 54 through a lock screw passing through ear 56. An advertising board 58 is positioned between backboard 52 and frame 55.

As shown in FIG. 9, when the lock screws are removed from lock nut 44, frame 55 can pivot relative to backboard 52. Advertising board 58 may then be removed and changed. In this way, the advertising board 58 is somewhat protected between frame 55 and board 52 against unauthorized removal or vandalism.

As shown in FIG. 10, advertising board 28 slides into a space provided between frame members 30.

Figure 11:
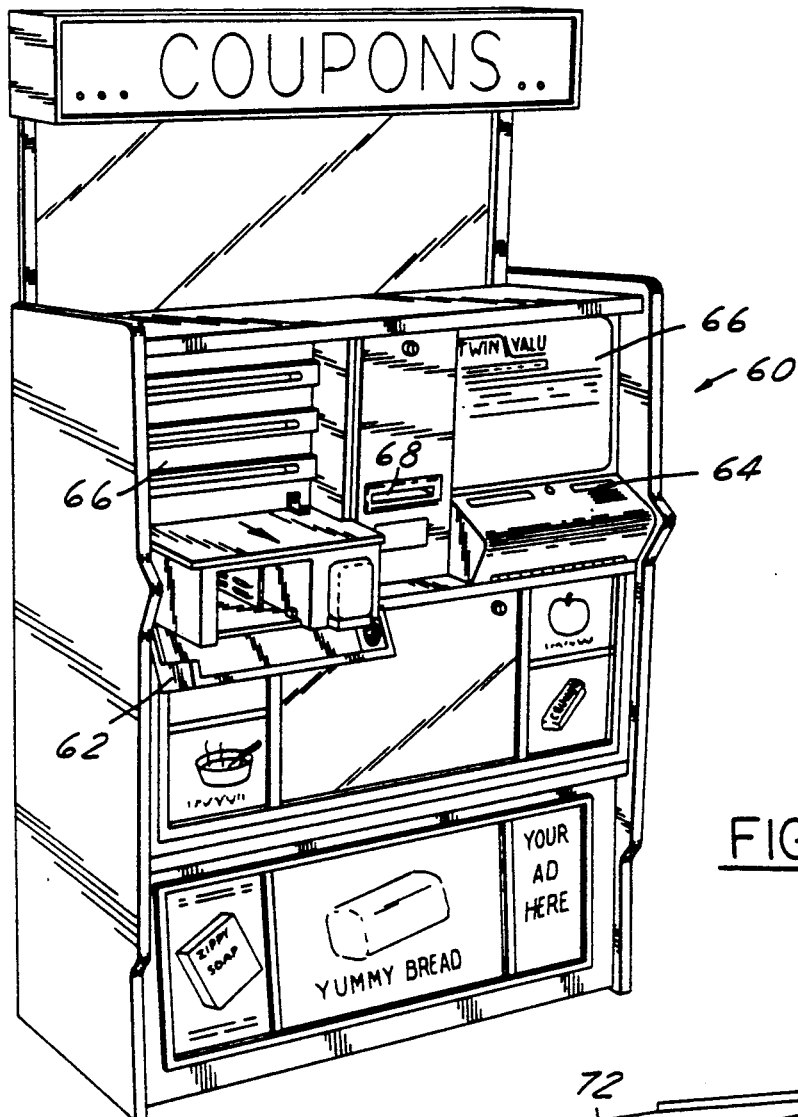
FIG. 11 is a perspective view of an alternative machine.

FIG. 11 shows an alternative machine 60 which includes keyboard members 62 and 64, and two display members 66 spaced laterally, with a single printer slot 68 positioned between the two. Functionally, the dual faced machine operates as two separate instances of the system described above but containing one computer and sharing the printer, sign, sound system, and motion sensor.

Figure 12:
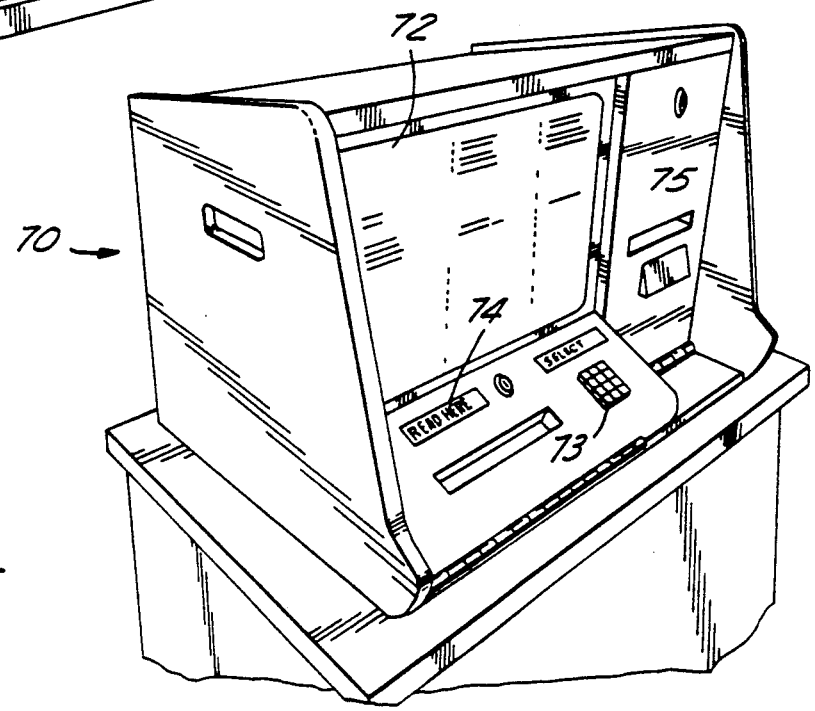
FIG. 12 is a perspective view of yet another alternative machine.

A desktop unit 70 positioned on a shelving unit is illustrated in FIG. 12. Unit 70 has a display board 72, keyboard 73, LED display 74, and printer 75 as in the prior systems. Unit 70 may swivel on its base.

Figure 13:
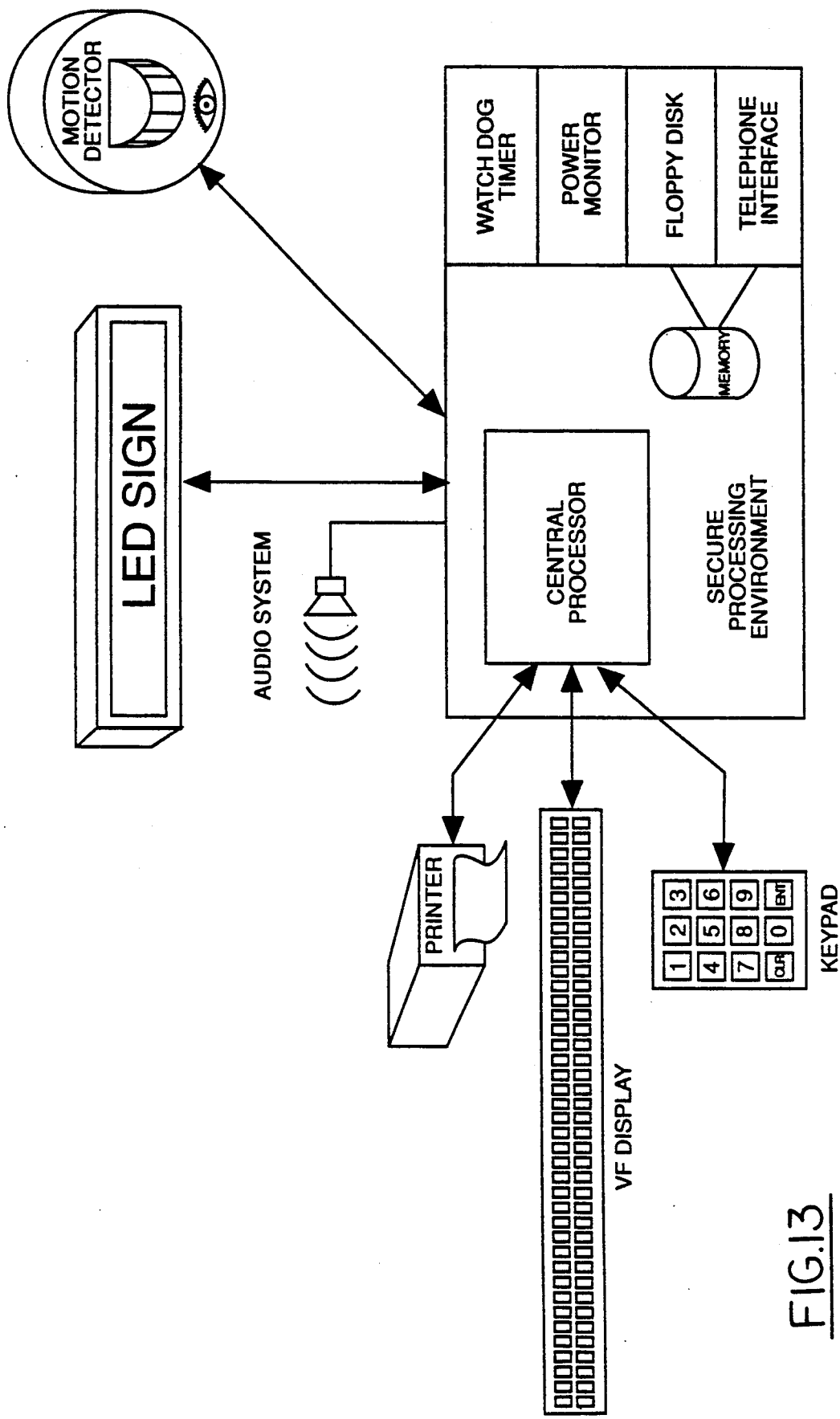
FIG. 13 is a schematic view of the main operational components of the inventive system.
Figure 14:
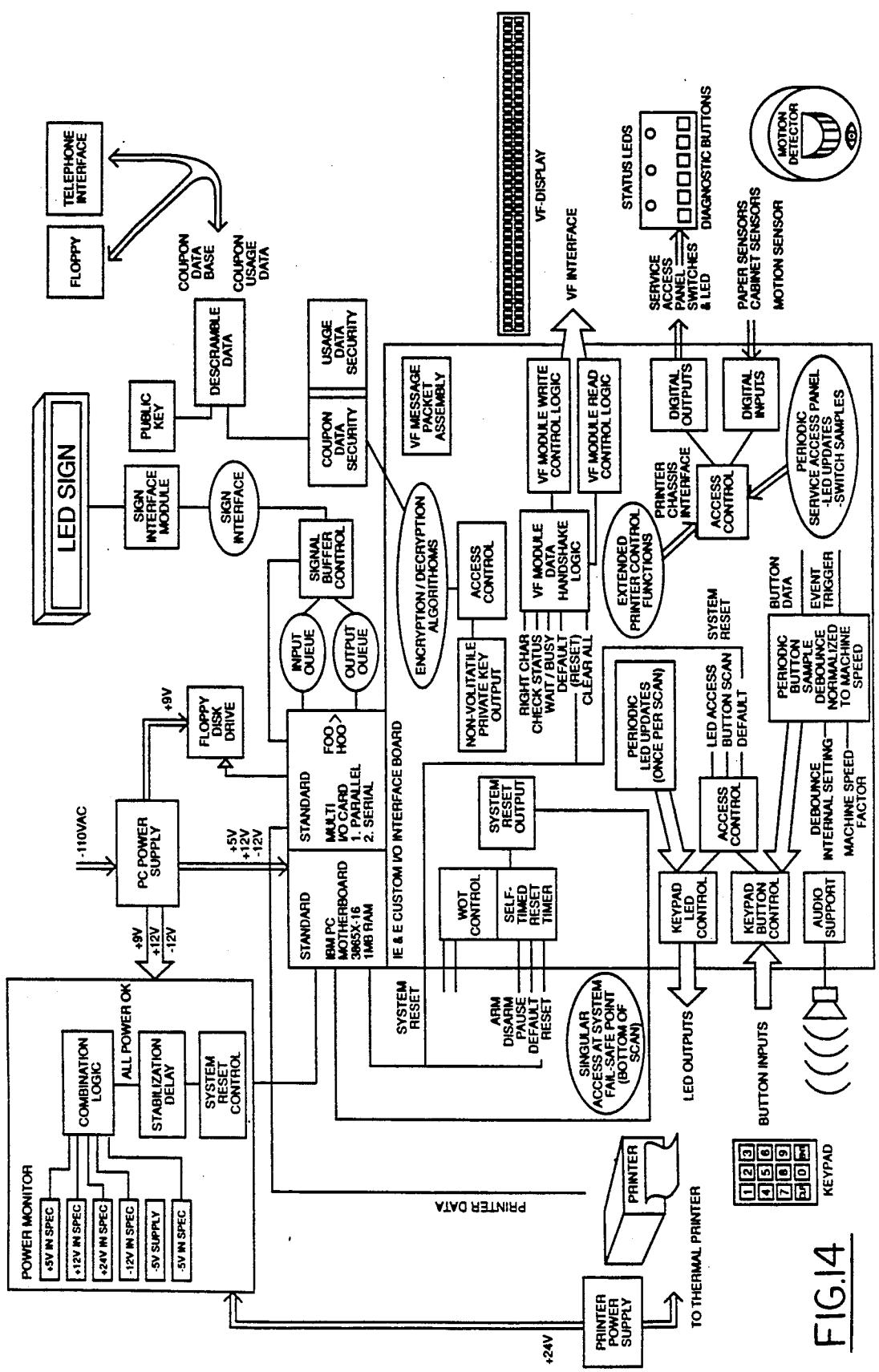
FIG. 14 is a detailed hardware schematic of the inventive system.

The basic operation of the system can be understood from FIG. 13. FIG. 14 is a more detailed schematic of the system. As shown, the central processor unit includes a watchdog timer, a power monitor, and a secured memory which receives and sends information to either a floppy disk or a telephone interface. The system can be adapted for both, with the floppy disc being available as a backup. The central processor also receives information from a keypad, wherein the consumer enters a particular coupon to be printed. Each button on the keypad can be illuminated to provide feedback to the user. The central processor sends information to a VF display associated with the keypad to provide information to the consumer, and also to a printer which prints the particular coupon which has been selected. A motion detector, which may be mounted on the bottom of the cabinet sends a signal to the central processor that a consumer is in the vicinity. That in turn actuates signals to activate the scroll sign to provide instructions to the consumer. The machine is in an "greet" mode. Based on the signals sent from the motion detector, the coupon machine changes state from "Attract" mode to "Greet" mode and changes the message on the LED scrolling sign and the VF display as well as the music and voice output and the behavior of the flashing LED buttons. Control of the operating state of the coupon machine is based on data and control signals derived from the motion sensor and issued from the real-time data collection layer of the system. The real-time data collection layer of the system is chiefly responsible for the measurement of traffic patterns and coupon activity which are logged on an hourly basis. If no consumer is sensed in the immediate vicinity, consumer attraction such as attracting messages on the LED scroll sign or audio signals are actuated. The machine is in an "attract" mode. The periods the machine is in each mode is stored in the memory. Alternate sensors, such as electric eyes, may also be used.

Thus, in summary, a coupon machine operator will provide coupon data to the machine and also send a hard copy display of the available coupons. The data would either be sent through the use of a floppy disk, or a telephone interface, both of which store information in a memory. A different version of the coupon machine will utilize a CRT display in place of the display board. For this version of the machine, completely unattended update of the coupons is possible via the telephone link.

A consumer selects a particular displayed coupon through the keypad. That coupon is then printed by the printer. The system periodically displays consumer attractant information through a VF display, an audio system, and a LED scroll sign. A motion detector continuously monitors the area, and controls whether consumer attractant or consumer instruction messages and used. The central processor stores statistics related to the traffic pattern in the immediate area around the coupon machine. The statistics stored are the percentage of time per hour that people were near the machine and the number of times that an individual walked near the machine. Further, the central processor stores the particular coupon selected, and the number of such coupons selected in the memory for discrete time periods.

A watchdog timer constantly monitors the operation of the overall system. In particular, the watchdog monitors if the power is interrupted, as might happen through a disturbance of the machine, lightning, or the machine simply being unplugged. If an interruption is detected, the machine is sent to a reset mode. In the reset mode, all messages go to an initial message welcoming the consumer. The memory will also survive any such power interruptions. A battery back-up power supply may be included to minimize such failures.

Further, the watchdog timer monitors the proper operation of the software. As the software runs, the watchdog timer is periodically "hit", if it is not hit within a particular discreet time element, the watchdog timer determines that there is a fault in the software. The watchdog timer then begins a reset of the system as described above. When the Watchdog Timer initiates a system reset, the data and time of the event is logged to permanent system memory. The watchdog will result in repetitive resets if a system fault occurs. The system can be constructed such that such repetitive failures result in a service call to the coupon machine operator.

The watchdog timer not only eliminates the system entering into a situation where it is not properly operating for a particularly long period of time, it also provides information to the memory on the operating condition of the system. This becomes valuable, given that a main benefit of the inventive system is the reliability of the feedback provided by the system.

When it is desired to change the displayed coupons, the coupon machine operator, or a representative, travels to the location of the particular machine. If a floppy disk memory is utilized, a new floppy disk is inserted into the floppy disk drive. Prior to doing that, the operator instructs the system to offload data from the memory onto the old floppy disk. The old floppy disk is then removed and sent to the coupon machine operator for analysis of the stored data. As mentioned above, this stored data includes the number of each type of coupon ordered per each unit of time, and information with regard to the percentage of time a consumer was within the vicinity of the coupon dispenser, and further whether unauthorized shutdowns or resets were required. Such information provides valuable feedback to the coupon machine operator to interest manufacturers to advertise coupons on the machine. The coupon machine operator can show the particular desirability of a particular coupon in a particular location. The coupon machine operator can also show the period of time that consumers were in the area of the machine, to gauge whether an undesirably low amount of ordering of a particular coupon may be due to that particular item not being popular in the particular location, or whether it is due to a simple lack of consumers in the area. Further, the storage of the number of unauthorized shutdowns or resets provides a indication of the reliability of all of the other stored data. If the system incurs an unusually large number of resets in a particular period of time, this might also indicate that a faulty or improper power connection has been supplied to the unit or that someone has been tampering with the unit at that location. Regardless of the frequency of shutdowns or system resets, the integrity of the data is preserved by the fault tolerant, data secured operating environment. Whenever a shutdown or system reset occurs, the data and time of the event is logged to permanent system memory.

If the system incurs an unusually large amount of shutdowns or resets in a particular period of time, this might draw into question the reality of the other stored data. On the other hand, if only a few unauthorized shutdowns or resets are found in any particular period of time, one can trust the reliability of the other stored data. Preferably, the machine includes a real time clock such that its recorded data is associated with particular time units (hour/day/week).

Once the old floppy disk is removed, the new floppy disk is inserted and new coupon data is loaded into the memory. Also, the paper hard copy of the new coupons is also mounted on display 22. The system is then again operating. The stored data is always protected from unauthorized tampering.

As an alternative to this floppy disk operation a telephone interface may periodically offload the data and enter new data. With the paper display board it is necessary for an individual to visit the location to update the coupon menu, however with the CRT based model of the coupon machine, a machine update can be initialed and completed from a remote processing center. Each machine can have an individual serial number such that the data will only be accepted by the proper machine. The fault tolerant, data secured operating environment employs Public/Private key cryptology via the DES standard to guarantee that even if an individual gains access to a machine's Private Key which is maintained in a special secured internal memory, such an individual still would not have the Public Key (which is only available at the remote processing center) and therefore the valuable coupon information could not be decrypted. Further, it is envisioned that cellular telephone technology could be utilized. Several units can be positioned in a particular location. If so, each unit can be independently referenced, although they may also be "chained". If chained, only one telephone link is necessary.

The sensor preferably has an approximate field of view of 100 degrees centered across the front of the machine with a 25 foot detection radius. The machine operator may be a computer, which periodically sends the information to the coupon dispensing machine through the telephone line. Alternatively, the computer could also periodically mail floppy discs and the papers to be used on the machine to the machine locations, where representatives could change the paper. For the paper display unit, a service person must change the hard paper copy even if the telephone link is used. This is not necessary on the CRT based models.

It is envisioned that the coupon data will be changed regularly, and possibly periodically. That is, the coupons may be changed on a weekly or monthly basis.

In one embodiment, the coupon machine utilized a 6502 based microcontroller board.

Preferred embodiments of the present invention have been disclosed, however, a worker of ordinary skill in the art would recognize that certain modifications would come within the scope of this invention. For that reason the following claims should be studied in order to determine the true scope and content of this invention.

We claim:

1. A system for printing consumer selected items comprising:
a central computer, a keyboard, a printer, a display of various items to be selected by a consumer, a sensor interfaced with said computer to sense the presence of a consumer in the vicinity of said system, and a consumer attractant system;
said computer interfaced to receive inputs from said keyboard, and causing particular consumer items to be printed by said printer in response to said keyboard signal, said keyboard being keyed to correspond to various items displayed on said display, said sensor sensing the presence of consumers in the immediate vicinity of said system, and said computer receiving signals from said sensor and controlling said consumer attractant system in response to said sensed presence of consumers in the immediate vicinity.

2. A system as recited in claim 1, wherein said sensor means the presence of a consumer by motion.

3. A system as recited in claim 1, wherein said consumer attractant system is a scroll sign which scrolls messages, and said scroll sign being changed from attractant to instructional messages when a consumer is sensed in the vicinity.

4. A system as recited in claim 3, wherein said consumer attractant system also includes audio signals.

5. A system as recited in claim 3, wherein an advertisement is positioned between frame members positioning said scroll sign above said printer and keyboard.

6. A system as recited in claim 1, wherein said display is a paper sign.

7. A system as recited in claim 6, wherein lights are positioned rearwardly of said paper sign to illuminate the items displayed on said paper sign.

8. A system as recited in claim 1, wherein a display cabinet houses the claimed members, and there is at least one advertisement mounted on said cabinet and secured by a lock screw.

9. A system for printing consumer selected items, comprising:
a central computer, a keyboard, a printer, a display of various items to be selected by a consumer, a sensor interfaced with said computer to sense the presence of a consumer in the vicinity of said system, a consumer attractant system;
said computer interfaced to receive inputs from said keyboard, and causing particular consumer items to be printed by said printer in response to said keyboard signal, said keyboard being keyed to correspond to various items displayed on said display for selection by the consumer, said sensors sensing the presence of consumers in the immediate vicinity of said system, and said computer receiving signals from said sensor and controlling said consumer attractant system in response to said sensed presence of consumers in the immediate vicinity; and
a memory which stores the types and amounts of consumer items selected, and further records the operation of the sensor to determine how often a consumer is in the vicinity of the system.

10. A system as recited in claim 9, wherein there is means to periodically change the displayed consumer items, and offload the stored data from the memory to a consumer operator.

11. A system as recited in claim 10, wherein the means to periodically change the displayed consumer items and offload the previously stored data from said memory includes a floppy disk which is periodically changed.

12. A system as recited in claim 9, wherein said computer is interfaced with a telephone line to transmit new information to the memory and offload the previously stored information.

13. A system as recited in claim 9, wherein a watchdog timer monitors various operation functions of the system, and resets the system should errors be detected, and the occurrence of a system error being stored in said memory.

14. A system as recited in claim 9, wherein a cabinet to enclose the claimed members includes at least a first door having a first lock and enclosing said computer, and a second door having a second lock and enclosing said printer.

15. A system as recited in claim 9, wherein a power test light is operating when the system is properly powered, and said power test light being visible through a slot formed in said first door.

16. A method for printing consumer selected items, comprising the steps of:
(A) displaying a plurality of consumer items which may be selected by a consumer;
(B) permitting the consumer to select one of the display items and input that selection to a computer;
(C) printing an item in response to a consumer selection;
(D) storing said consumer selection in a memory;
(E) changing the items to be displayed, offloading the previously stored information to a system operator;
(F) monitoring the proper operation of said system, storing said monitored operation in said memory; and
(G) monitoring the presence of consumers in the vicinity of said system, storing said monitored presence in said memory.

17. The method as recited in claim 16, wherein the actual display is a paper display that is changed when the displayed items in the memory is also changed.

18. A dispensing system for dispensing printed consumer items, comprising:

a cabinet;

a consumer display including a hard paper copy of a plurality of consumer items to be selected, a light source positioned behind said display to illuminate said display;

a consumer keypad input with numbers, keyed to particular consumer items, displayed on said display, a central processing unit receiving signals from said keypad and printing selected consumer items on a printer mounted within said cabinet, a floppy disk drive for sending data relative to the consumer items displayed to said computer; and a scroll sign for sending messages to consumers, said scroll sign being positioned vertically above the remainder of said cabinet.

19. A system as recited in claim 18, wherein frame members position said scroll sign vertically above the remainder of said cabinet, and an advertisement is placed between said frame members.

20. A system as recited in claim 18, wherein a selectively openable door is positioned vertically beneath the printer and keypad, an advertisement being positioned within said door, said door comprising a backing board and a frame, both said backing board and said frame being pivotal relative to said cabinet, and said frame member being selectively removable from said backing board to allow changing of said advertisement.

* * * * *